United States Patent [19]
Matsuda et al.

[11] Patent Number: 6,108,532
[45] Date of Patent: Aug. 22, 2000

[54] INCOMING CALL CONTROL BASED ON THE MOVING SPEED OF A RADIO COMMUNICATIONS APPARATUS

[75] Inventors: Tomohiro Matsuda; Hironori Fujii, both of Tokyo, Japan

[73] Assignee: Kabushiki Kaisha Toshiba, Kawasaki, Japan

[21] Appl. No.: 09/019,365

[22] Filed: Feb. 5, 1998

[30] Foreign Application Priority Data

Feb. 6, 1997 [JP] Japan .................................. 9-023796

[51] Int. Cl.⁷ .................................................. H04M 11/10
[52] U.S. Cl. ........................ 455/413; 455/412; 455/441; 455/238.1; 455/67.6
[58] Field of Search .................................. 455/441, 412, 455/413, 67.1, 67.3, 67.6, 575, 517, 238.1, 422

[56] References Cited

U.S. PATENT DOCUMENTS

| | | | |
|---|---|---|---|
| 5,140,695 | 8/1992 | Yasuda et al. ........................ | 455/441 |
| 5,396,645 | 3/1995 | Huff ...................................... | 455/441 |
| 5,548,806 | 8/1996 | Yamaguchi et al. .................. | 455/441 |
| 5,787,348 | 7/1998 | Willey et al. ......................... | 455/441 |
| 5,913,168 | 6/1999 | Moreau et al. ....................... | 455/441 |

*Primary Examiner*—Reinhard J. Eisenzopf
*Assistant Examiner*—Eliseo Ramos-Feliciano
*Attorney, Agent, or Firm*—Oblon, Spivak, McClelland, Maier & Neustadt, P.C.

[57] ABSTRACT

In a radio communications apparatus according to the present invention, an RSSI detects the strength of a received signal, and a fading pitch detection circuit detects a fading pitch of the signal from the detected strength thereof and determines whether the moving speed of the terminal apparatus exceeds a predetermined value. A high-speed moving time incoming call control means determines whether the apparatus is moving at high speed based on the determination results of the fading pitch detection circuit. If it is doing so, the control means automatically responds to the incoming call, transmits a response message from a response message storage area to a communication party, and stores a message input by the communication party in a message storage area.

44 Claims, 3 Drawing Sheets

INCOMING CALL CONTROL BASED ON THE MOVING SPEED OF A RADIO COMMUNICATIONS APPARATUS

BACKGROUND OF THE INVENTION

The present invention relates to a radio communications apparatus used in a radio communications system such as a cellular system and a PCS (Personal Communications Service), and a method for controlling an incoming call in the radio communications apparatus.

A radio communications system, such as a cellular system and a PCS, has recently been improved further in convenience according to an increase in base stations and telephone lines, whereas the danger in using it in a car which a user is driving and the bad manners in which a user uses it in a train, have become a social problem.

A prior art radio communications apparatus has a so-called hand-free function which allows a user to speak without taking the terminal apparatus in order to insure safety while the user is driving a car. The radio communications apparatus also has an answering function, and a vibration call function of notifying a user of an incoming call by vibration in place of a tone indicative of the incoming call, in order to have good manners in a train.

In the prior art radio communications apparatus having the above functions, however, it is very troublesome for a user to set the functions whenever the user drives a car or rides on a train, or to clear them when the user does not drive or ride on the train.

BRIEF SUMMARY OF THE INVENTION

It is accordingly an object to provide a radio communications apparatus capable of insuring safety in driving a car and having good manners in a train without switching a function in accordance with user's situations, and a method for controlling an incoming call in the radio communications apparatus.

To attain the above object, according to one aspect of the present invention, there is provided a radio communications apparatus connectable through a radio channel and a radio base station connected to a public network, comprising:

moving speed detection means for detecting a moving speed of the terminal apparatus from a fading pitch of a received signal; and incoming call control means for controlling an incoming call in accordance with a detection result of the moving speed detection means.

The radio communications apparatus further comprises voice data storage means for storing a voice message. In this apparatus, the incoming call control means responds to the incoming call and transmits the voice message stored in the voice data storage means to a communication party when the moving speed detected by the moving speed detection means is higher than a preset speed level.

In the radio communications apparatus, the incoming call control means responds to the incoming call, transmits the voice message stored in the voice data storage means to a communication party, and records voice data sent from the communication party in the voice data storage means, when the moving speed detected by the moving speed detection means is higher than a preset speed level.

In the radio communications apparatus having the above constitution, while a user is moving at high speed, for example, when he or she drives a car or rides on a train, the apparatus automatically responds to an incoming call and transmits a predetermined message to a communication party or stores a message from the communication party.

It is thus possible for the user to insure safety in driving a car and have good manners in a train without switching a function of the apparatus whenever the user gets on and off the car or train.

Furthermore, the radio communications apparatus according to the present invention further comprises voice data storage means for storing a voice message and a mode selection means for selecting a first mode and a second mode. In this apparatus, the incoming call control means does not control a notification of the incoming call when the moving speed detected by the moving speed detection means is higher than a preset speed level and the first mode is selected by the mode selection means, and responds to the incoming call and transmits the voice message stored in the voice data storage means to a communication party when the second mode is selected by the mode selection means.

The radio communications apparatus of the present invention further comprises voice data storage means for storing a voice message and a mode selection means for selecting a first mode and a second mode. In this apparatus, the incoming call control means does not control a notification of the incoming call when the moving speed detected by the moving speed detection means is higher than a preset speed level and the first mode is selected by the mode selection means, and responds to the incoming call, transmits the voice message stored in the voice data storage means to a communication party, and records voice data sent from the communication party in the voice data storage means when the second mode is selected by the mode selection means.

Consequently, according to the apparatus having the above constitution, while a user is moving at high speed, an incoming call control operation can be performed in accordance with a mode preset by the mode selection means.

The radio communications apparatus according to the present invention further comprises non-response incoming call notification means for notifying a user of an incoming call to which the user does not respond when the incoming call control means responds to the incoming call.

In this apparatus, when there is an incoming call to which the incoming call control means responds in place of a user, the user can be notified of the call.

The radio communications apparatus further comprises vibration means for generating a vibration. In this apparatus, the incoming call control means controls an operation of the vibration means and notify a user of an incoming call when the moving speed detected by the moving speed detection means is higher than a preset speed level.

According to the apparatus having the above constitution, since an incoming call notification method is automatically changed to a vibration notification method while a user is moving at high speed in a train or a bus, the user does not annoy the other passengers with a tone of the incoming call without switching a function of the notification means whenever the user gets on and off the car or train.

In the radio communications apparatus, the moving speed detection means detects a power level of the received signal and detects a fading pitch of the received signal from the power level thereby to obtain a moving speed of the apparatus.

In the radio communications apparatus, the moving speed detection means includes:

power level detection means for detecting a power level of the received signal;

fading determination means for comparing the power level detected by the power level detection means with a preset fading determination level to detect occurrence of fading; and count means for counting the number of times the fading occurs for a predetermined period of time based on a determination result of the fading determination means to detect the moving speed of the apparatus.

According to the radio communications apparatus having the above constitution, since the moving speed is detected by the power level of the received signal, the moving speed of a vehicle or the like on which a user rides can be detected by the apparatus itself. Unlike the prior art apparatus, the apparatus of the present invention need not be connected to a computer of a moving body to receive moving speed information.

To attain the above object, according to another aspect of the present invention, there is provided a method for controlling an incoming call in a radio communications apparatus connectable through a radio channel and a radio base station connected to a public network, comprising:

a first step of detecting a moving speed of the terminal apparatus from a fading pitch of a received signal; and a second step of controlling an incoming call in accordance with a detection result of the first step.

In the incoming call controlling method, the second step includes a step of responding to the incoming call and transmitting the voice message stored in the voice data storage means to a communication party when the moving speed detected in the first step is higher than a preset speed level.

In the incoming call controlling method, the second step includes a step of responding to the incoming call, transmitting the voice message stored in the voice data storage means to a communication party, and recording voice data sent from the communication party in the voice data storage means, when the moving speed detected in the first step is higher than a preset speed level.

In the incoming call controlling method described above, while a user is moving at high speed, for example, when he or she drives a car or rides on a train, the apparatus automatically responds to an incoming call and transmits a predetermined message to a communication party or stores a message from the communication party.

It is thus possible for the user to insure safety in driving a car and have good manners in a train without switching a function of the apparatus whenever the user gets on and off the car or train.

The incoming call controlling method further comprises a mode selection step of selecting one of a first mode and a second mode, and the second step includes a step of not controlling a notification of the incoming call when the first mode is selected in the mode selection step and the moving speed detected in the first step is higher than a preset speed level, and responding to the incoming call and transmitting the voice message stored in the voice data storage means to a communication party when the second mode is selected in the mode selection step and the moving speed detected in the first step is higher than a preset speed level.

The incoming call controlling method further comprises a mode selection step of selecting one of a first mode and a second mode, and the second step includes a step of not controlling a notification of the incoming call when the first mode is selected in the mode selection step and the moving speed detected in the first step is higher than a preset speed level, and responding to the incoming call, transmitting the voice message stored in the voice data storage means to a communication party, and recording voice data sent from the communication party in the voice data storage means when the second mode is selected in the mode selection step and the moving speed detected in the first step is higher than a preset speed level.

Consequently, according to the above method, while a user is moving at high speed, an incoming call control operation can be performed in accordance with a mode preset by the mode selection means.

Furthermore, the incoming call controlling method further comprises a third step of notifying a user of an incoming call to which the user does not respond when the second mode is selected in the mode selection step and there is a response to the incoming call in the second step.

Consequently, according to the above method, when there is an incoming call to which the incoming call control means responds in place of a user, the user can be notified of the call.

In the incoming call controlling method, the second step includes a step of controlling an operation of vibration means for generating a vibration and notifying a user of an incoming call when the moving speed detected in the first step is higher than a preset speed level.

According to the method described above, since an incoming call notification method is automatically changed to a vibration notification method while a user is moving at high speed in a train or a bus, the user does not annoy the other passengers with a tone of the incoming call without switching a function of the notification means whenever the user gets on and off the car or train.

In the incoming call controlling method, the first step includes a step of detecting a power level of the received signal and detecting a fading pitch of the received signal from the power level thereby to obtain a moving speed of the apparatus.

In the incoming call controlling method, the first step includes:

a step of detecting a power level of the received signal;

a step of comparing the detected power level with a preset fading determination level to detect occurrence of fading; and a step of counting the number of times the fading occurs for a predetermined period of time based on a result of the fading occurrence detecting step to detect the moving speed of the apparatus.

Since, therefore, the moving speed is detected by the power level of the received signal, the moving speed of a vehicle or the like on which a user rides can be detected by the apparatus itself. Unlike the prior art apparatus, the apparatus of the present invention need not be connected to a computer of a moving body to receive moving speed information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A radio communications apparatus according to an embodiment of the present invention will be described with reference to the accompanying drawings.

Figure 1:
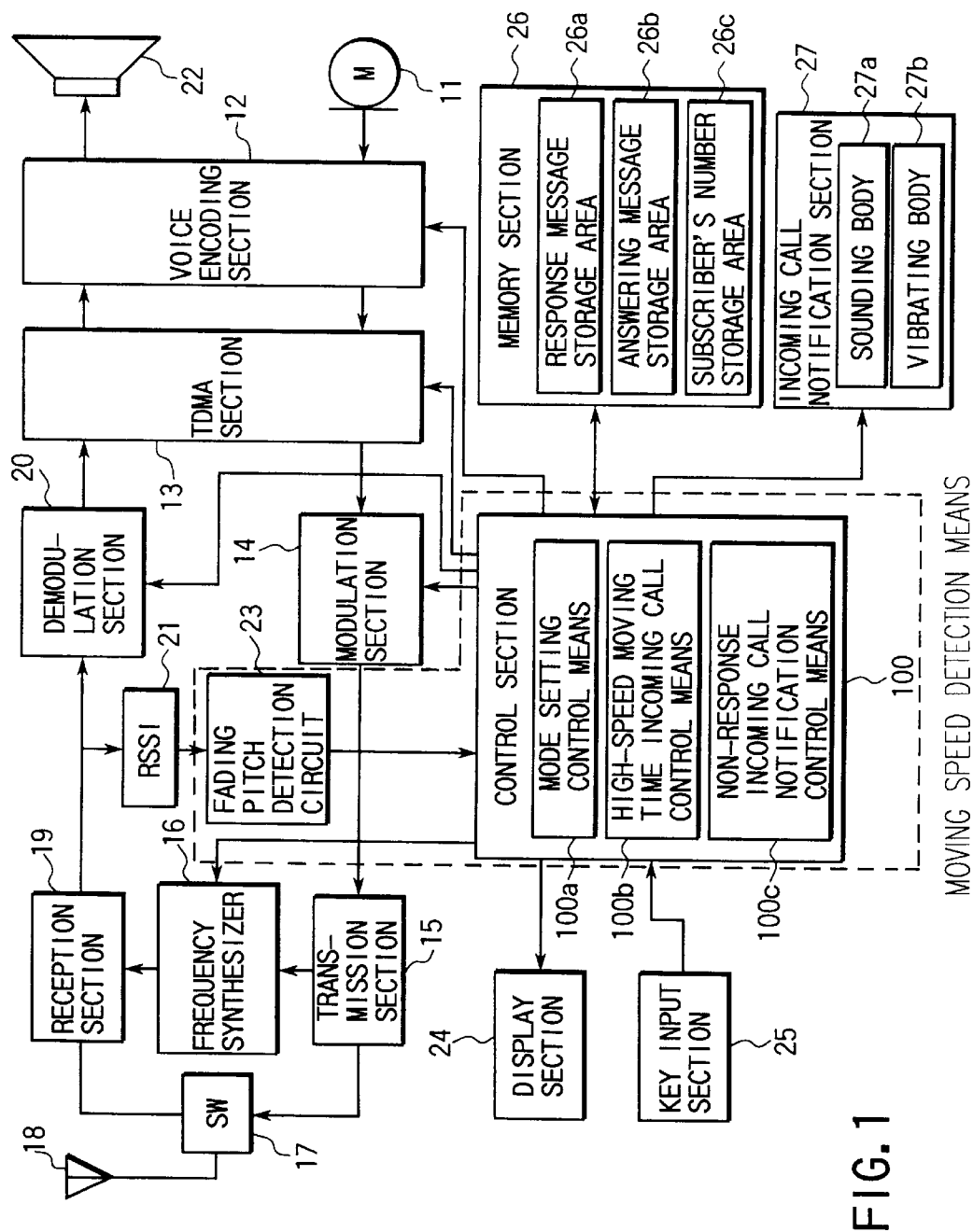
FIG. 1 is a circuit block diagram illustrating a configuration of a radio communications apparatus according to a first embodiment of the present invention.

FIG. 1 illustrates a configuration of the radio communications apparatus. This apparatus will now be described, giving a terminal apparatus of a PDC (Personal Digital Cellular) system as an example.

An analog voice signal is input from a microphone (M) 11 to a voice encoding section 12. The section 12 converts the analog voice signal into a digital speech signal of 11.2 kbps using algorithm such as VSELP (Vector Sum Excited Linear Predictive) voice coding. The digital speech signal is then input to a TDMA (Time Division Multiple Access) section 13.

The TDMA section 13 converts the digital speech signal into an error correction code and subjects it to interleaving and scrambling processing to generate a transmission frame. The TDMA section 13 inserts the error correction code into a time slot indicated by a control section 100 and supplies it to a modulating section 14.

The modulating section 14 subjects the transmission frame to route roll-off waveform shaping to produce a $\pi/4$QPSK baseband signal. This signal is input to a transmission section 15.

The transmission section 15 executes orthogonal modulation by mixing the $\pi/4$QPSK baseband signal with a carrier signal generated by a frequency synthesizer 16. The $\pi/4$QPSK baseband signal is therefore converted into a radio frequency signal of a radio speech channel indicated by the control section 100.

The radio frequency signal so generated is amplified to have a predetermined transmission power level by a power amplifier (not shown) and then transmitted from an antenna 18 to a base station of a radio communications system through a high-frequency switch (SW) 17.

The radio-frequency signal transmitted through the radio speech channel from the base station of the radio communication system, is received by the antenna 18 and then supplied to a reception section 19 through the high-frequency switch 17.

The reception section 19 mixes the radio-frequency signal with a received local oscillation signal generated from the frequency synthesizer 16 to convert it into a $\pi/4$ shift QPSK modulated wave signal having an intermediate frequency. The frequency of the received local oscillation signal is indicated by the control section 100.

The $\pi/4$ shift QPSK modulated wave signal is input to a demodulation section 20 and an RSSI (Received Signal Strength Indicator) 21. The demodulation section 20 digitally demodulates the $\pi/4$ shift QPSK modulated wave signal and reproduces a digital speech signal as a baseband signal. The digital speech signal is input to the TDMA section 13.

The TDMA section 13 establishes frame synchronization by the reproduced digital speech signal and divides it into a plurality of digital speech signals for each time slot by the control section 100.

Of these digital speech signals, a digital speech signal of a time slot for the user's own apparatus is subjected to de-scrambling, de-interleaving, and error correction decoding. The digital speech signal so processed is supplied to the voice encoding section 12.

The voice encoding section 12 converts the digital speech signal, which is output from the TDMA section 13, into an analog voice signal. The analog voice signal is amplified by a receiving-signal amplifier (not shown) and then output loudly from a speaker 22.

Upon receiving the $\pi/4$ shift QPSK modulated wave signal of the intermediate frequency converted by the reception section 19, the RSSI 21 detects the strength of the radio-frequency signal supplied to the terminal apparatus. The detected strength is input to a fading pitch detection circuit 23 as an RSSI signal.

The circuit 23 detects a fading pitch from the strength detected by the RSSI to determine whether a moving speed of the terminal apparatus exceeds a predetermined value.

An example of the configuration of the fading pitch detection circuit 23 will now be described with reference to FIG. 2.

Figure 2:
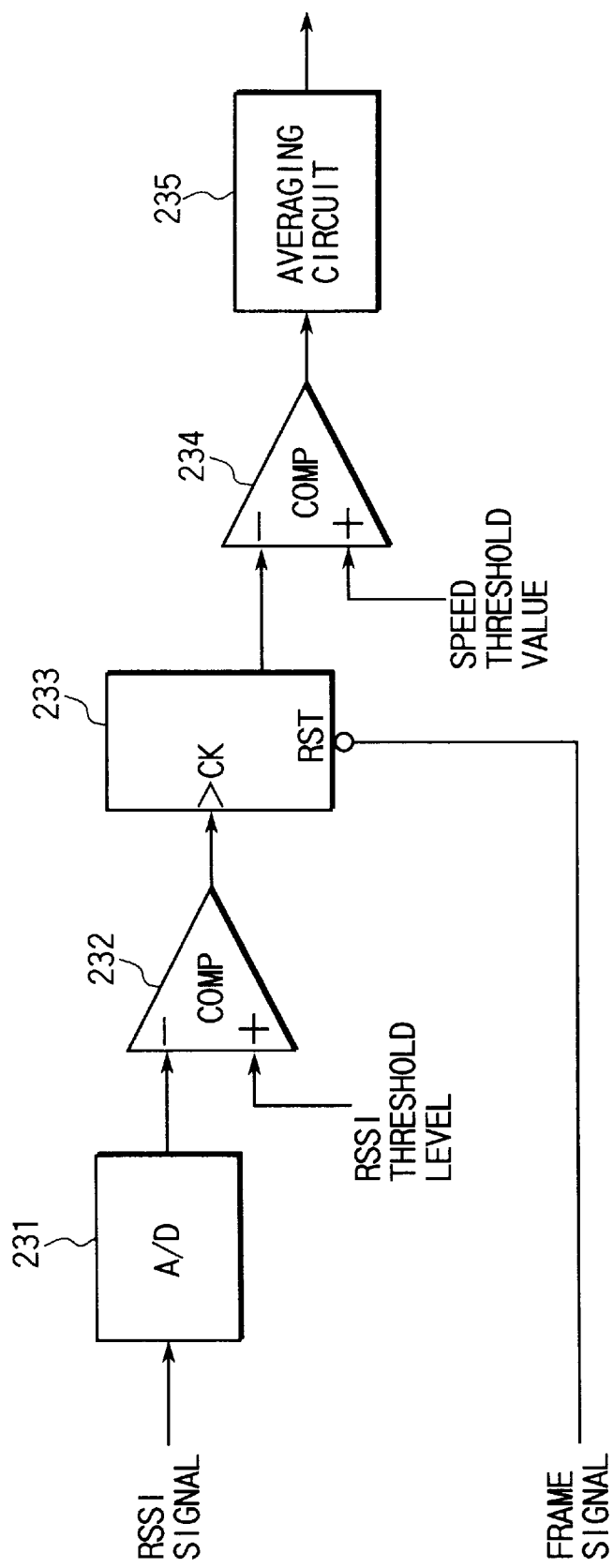
FIG. 2 is a circuit block diagram illustrating a configuration of a fading pitch detection circuit of the apparatus of FIG. 1.

As illustrated in FIG. 2, the fading pitch detection circuit 23 includes an A/D converter 231, a first comparator (COMP) 232, a counter circuit 233, a second comparator (COMP) 234, and an averaging circuit 235.

The RSSI signal detected by the RSSI 21, is converted into a digital RSSI signal by the A/D converter 231, and it is input to one input terminal of the first comparator 232.

The first comparator 232 compares the digital RSSI signal with a signal having a threshold level of RSSI input to another input terminal of the first comparator 232, and outputs a detection signal whenever the level of the RSSI signal is lower than the threshold level. In other words, the first comparator 232 detects that the value of RSSI is lower than the threshold level.

The counter circuit 233 is supplied with the detection signal from the first comparator 232, counts the number of times the RSSI value is lower than the threshold level, and inputs the counted value to one input terminal. A frame signal is input from the control section 100 (not shown) to a reset terminal of the counter circuit 233, the values counted so far are reset whenever the frame is changed.

The second comparator 234 compares the counted value of the counter circuit 233 with a speed threshold value Vh input to the other input terminal thereof. As a result of the comparison, if the counted value exceeds the speed threshold value Vh, the averaging circuit 235 is supplied with a detection signal indicating that the speed of the terminal apparatus exceeds a speed set by the speed threshold value Vh.

The averaging circuit 235 averages the number of inputs of detection signals described above during a period of time corresponding to a plurality of frames. A result of the averaging is input to the control section 100.

With the above configuration, the fading pitch detection circuit 23 detects the number of times fading occurs per frame, by the A/D converter 231, first comparator 232, and counter circuit 233, thereby detecting a moving speed of the radio communications apparatus.

The second comparator 234 compares the above detected moving speed of the terminal apparatus with the speed threshold value Vh to determine whether the moving speed exceeds a predetermined speed. The determination results are averaged by the averaging circuit 235, and the averaged value is input to the control section 100.

Returning to FIG. 1, a display section 24 is constituted of, e.g., an LCD (Liquid Crystal Display) to visually display the conditions (calling/called, amount of remaining battery, strength of reception) of a user's own terminal apparatus and dial data read out from a memory section 26 (described later).

A key input section 25 includes a function setting key for setting various functions of selecting an incoming call notification method (audible sound or vibration or no notification) as well as a key for fulfilling a normal function of calling and termination, such as a ten-key for inputting dial numbers.

The memory section 26 employs a semiconductor memory, such as a ROM and a RAM, as a storage medium. The storage medium includes a response message storage area 26a, an answering message storage area 26b and a subscriber's number storage area 26c in addition to an area for storing control data, set data and dial data corresponding to simplified dialing as well as control programs of the control section 100 and ID data of the user's own terminal necessary for authentication.

The response message storage area 26a is an area for storing voice data to be transmitted to a communication party at the time of an automatic answering operation or an automatic response to an incoming call, which will be described later. For example, the area 26a stores a response message "I can't take your call now. Please record your message after a tone.", a message "I can't take your call now because I'm moving at high speed.", and the like.

The message storage area 26b stores voice data, which is input from a communication party at the time of the answering operation or the automatic response, together with the time at which the voice data is input.

The subscriber's number storage area 26c is an area for storing a caller subscriber's number which is notified from a caller side at the time of an incoming call.

When an incoming call is given to the terminal apparatus, an incoming call notification section 27 notifies a user of the incoming call by the control section 100. The section 27 includes a sounding body 27a for making an audible sound for the notification and a vibrating body 27b for causing a vibration by, e.g., an eccentric motor for the notification.

The control section 100 has, for example, a microcomputer as a main control section, and executes normal control such as control of transmission/reception, that of a call, that of the display section 24, etc.

The control section 100 fulfills a so-called answering function of recording a message of a communication party through an automatic response when the user does not respond for a predetermined period of time, and has a mode setting control means 100a, a high-speed moving time incoming call control means 100b and a non-response incoming call notification control means 100c which serve to carry out a new control function.

The mode setting control means 100a sets a mode to be designated through the key input section 25 by the user. This mode includes an automatic response mode in which the terminal apparatus automatically responds to an incoming call when the terminal apparatus is moving at high speed and a non-response mode in which the apparatus does not automatically respond thereto.

When the average of the number of times, which exceeds the speed threshold value Vh obtained by the fading pitch detection circuit 23, exceeds a preset value, the high-speed time incoming call control means 100b determines that the terminal apparatus is moving at high speed and automatically responds to the incoming call if the automatic response mode is set by the mode setting control means 100a. Then, the response message recorded in the response message storage area 26a is sent out to the communication party, and the message input by the communication party is recorded in the message storage area 26b.

When a user does not respond to an incoming call or the high-speed time incoming call control means 100b responds to an incoming call, the non-response incoming call notification control means 100c records a caller subscriber's number notified by the caller's side in the subscriber's number storage area 26c, and causes the display section 24 to display both the subscriber's number and that there is an incoming call to which the user does not respond.

An operation of the terminal apparatus of a PDC system having the above constitution, will be described. Since a normal calling/called (terminating) operation is the same as that of the prior art apparatus, its description is omitted. Here, in particular, a terminating operation at the time of high-speed movement will now be described.

Figure 3:
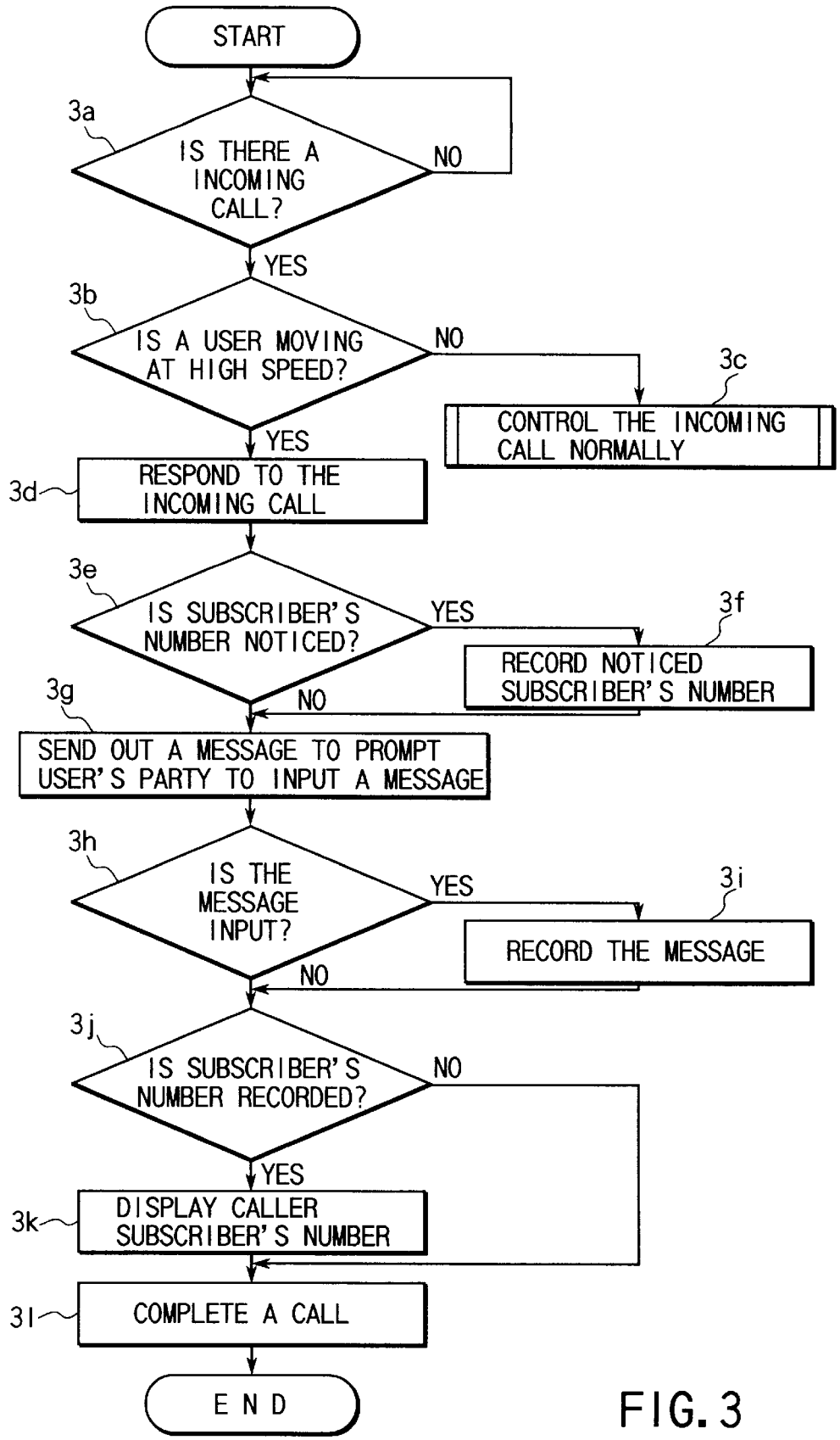
FIG. 3 is a flowchart showing an operation of the apparatus of FIG. 1 which is moving at high speed.

FIG. 3 is a flowchart for explaining the terminating operation. In this embodiment, a mode (response mode/non-response mode), which is designated in advance through the key-input section 25 by a user, is set by the mode setting control means 100a.

First, in step 3a, a user stands by for an incoming call. If the call is given, step 3a advances to step 3b. In step 3b, based on a detection result of the fading pitch detection circuit 23, the high-speed moving time incoming call control means 100b determines whether the terminal apparatus is moving at high speed.

If the apparatus is not moving at high speed, step 3b goes to step 3c to perform a normal terminating operation. On the other hand, if it is moving at high speed, step 3b advances to step 3d, and the high-speed moving time incoming call control means 100b executes the control of the following steps.

In step 3d, the high-speed moving time incoming call control means 100b responds to the incoming call. The flow goes to step 3e. In step 3e, the non-response incoming call notification control means 100c determines whether the incoming call includes a subscriber's number of a caller.

If the subscriber's number is included therein, the non-response incoming call notification control means 100c records the subscriber's number in a subscriber's number storage area 26c in step 3f. The flow advances to step 3g. On the other hand, if it is not included therein, the flow moves to 3g but not through step 3f.

In step 3g, a response message is sent out of the response message storage area 26a to prompt a communication party to record the message. The flow goes to step 3h.

In step 3h, it is determined whether the communication party inputs a message. When the message is input, step 3h advances to step 3i. If no message is input, step 3h goes to step 3j.

In step 3i, the message input by the communication party is recorded in the message storage area 26b. The flow moves to 3j. In step 3j, the non-response incoming call notification control means 100c determines whether the subscriber's number is recorded in the subscriber's number storage area 26c. If it is recorded, the flow moves to step 3k. If not, the flow goes to step 3i.

In step 3k, the means 100c reads the subscriber's number of the caller recorded in the area 26c and causes the display section 24 to display the subscriber's number and that there is an incoming call such as "INCOMING CALL" and "MESSAGE" to which the user does not respond. The flows goes to step 31. In step 31, the completion of a call in the speech pass established by the above incoming call is executed.

If the subscriber's number of the caller is not noticed, only the incoming call to which the user does not respond is displayed.

When a user is not moving at high speed, the terminal apparatus having the above constitution performs a normal terminating operation. When a user is moving at high speed, the apparatus automatically responds to an incoming call, transmits a response message, and stores a message input by a communication party.

Consequently, the above terminal apparatus is capable of insuring safety in driving a car and having good manners in a train without changing a function set in accordance with user's situations.

Even when the terminal apparatus responds to an incoming call in place of a user, the user can easily return a call to the caller since the response to the incoming call and the subscriber's number of the caller are both stored in the subscriber's number storage area 26c.

In the terminal apparatus having the foregoing structure, a user's moving speed is detected by the fading pitch. Unlike the prior art car-telephone apparatus as disclosed in Jpn. Pat. Appln. KOKAI Publication No. 5-105005, the terminal apparatus of the present invention does not rely upon the moving speed information sensed by a speed sensor of a car; accordingly, it does not require any special connection with the car.

The above prior art car-telephone apparatus cannot be employed in a train or the like in which no moving speed information can be obtained from a speed sensor. However, in the terminal apparatus of the present invention, the moving speed is sensed by the fading pitch, so that it produces good effects even when a user gets on any moving vehicle.

The present invention is not limited to the above embodiment. In the embodiment, a message of a communication party is recorded when a user is moving at high speed. However, for example, a so-called hand-free function, which allows a user to speak through an automatic response when an incoming call is made at the time of high-speed movement, can be fulfilled.

Furthermore, the control section 100 can include an incoming call notification control means by which a user selects an incoming call notification of the sounding body 27a and that of the vibrating body 27b in accordance with the moving speed, thereby to notify the user of the incoming call only by the vibrating body 27b at the time of high-speed movement. Thus, for a user who often gets on a train, the incoming call notification method is automatically switched in accordance with the condition where the user gets on a train and the other condition where the user is not moving at high speed.

In the foregoing embodiment, the terminal apparatus is of a PDC system. However, even though the present invention is applied to a terminal apparatus of another system, e.g., a PCS system, the same advantage can be obtained. Various changes and modifications can be made without departing from the scope of the subject matter of the present invention.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus for establishing communications over a radio channel, comprising:

moving speed detection means for determining whether a moving speed of said radio communication apparatus exceeds a predetermined value from a fading pitch of a received signal; and incoming call control means for responding to an incoming call and notifying that said radio communication apparatus is moving in cases where said moving speed detection means determines that the moving speed of said radio communication apparatus exceeds the predetermined value.

2. The apparatus according to claim 1, wherein the apparatus further comprises voice data storage means for storing a voice message, and the incoming call control means responds to the incoming call and transmits the voice message stored in the voice data storage means to a communication party when the moving speed detected by the moving speed detection means is higher than a preset speed level.

3. The apparatus according to claim 2, further comprising non-response incoming call notification means for notifying a user of an incoming call to which the user does not respond when the incoming call control means control the incoming call.

4. The apparatus according to claim 2, wherein the incoming call control means responds to the incoming call, transmits the voice message stored in the voice data storage means to a communication party, and records voice data transmitted from the communication party in the voice data storage means, when the moving speed detected by the moving speed detection means is higher than a preset speed level.

5. The apparatus according to claim 4, further comprising non-response incoming call notification means for notifying a user of an incoming call to which the user does not respond when the incoming call control means control the incoming call.

6. The apparatus according to claim 1, wherein the apparatus further comprises voice data storage means for storing a voice message and a mode selection means for selecting a first mode and a second mode, and the incoming call control means does not control a notification of the incoming call when the moving speed detected by the moving speed detection means is higher than a preset speed level and the first mode is selected by the mode selection means, and responds to the incoming call and transmits the voice message stored in the voice data storage means to a communication party when the second mode is selected by the mode selection means.

7. The apparatus according to claim 6, further comprising non-response incoming call notification means for notifying a user of an incoming call to which the user does not respond when the incoming call control means control the incoming call.

8. The apparatus according to claim 1, wherein the apparatus further comprises voice data storage means for storing a voice message and a mode selection means for selecting a first mode and a second mode, and the incoming call control means does not control a notification of the incoming call when the moving speed detected by the moving speed detection means is higher than a preset speed level and the first mode is selected by the mode selection means, and responds to the incoming call, transmits the voice message stored in the voice data storage means to a communication party, and records voice data transmitted from the communication party in the voice data storage means when the second mode is selected by the mode selection means.

9. The apparatus according to claim 8, further comprising non-response incoming call notification means for notifying a user of an incoming call to which the user does not respond when the incoming call control means control the incoming call.

10. The apparatus according to claim 1, wherein the apparatus further comprises vibration means for vibrating the apparatus, and the incoming call control means controls an operation of the vibration means and notify a user of an incoming call when the moving speed detected by the moving speed detection means is higher than a preset speed level.

11. The apparatus according to claim 1, wherein the moving speed detection means detects a power level of the received signal and detects a fading pitch of the received signal from the detected power level thereby to obtain a moving speed of the apparatus.

12. The apparatus according to claim 11, wherein the moving speed detection means includes:
power level detection means for detecting a power level of the received signal;
fading determination means for comparing the power level detected by the power level detection means with a preset fading determination level to detect occurrence of fading; and
counting means for counting the number of times the fading occurs for a predetermined period of time based on a determination result of the fading determination means.

13. A radio communication apparatus for establishing communications over a radio channel comprising:
moving speed detection means for determining whether a moving speed of said radio communication apparatus exceeds a predetermined value from a state of a received signal; and
incoming call control means for responding to an incoming call and notifying that said radio communication apparatus is moving in cases where said moving speed detection means determines that the moving speed of said radio communication apparatus exceeds the predetermined value.

14. The apparatus according to claim 13, wherein the apparatus further comprises voice data storage means for storing a voice message, and the incoming call control means responds to the incoming call and transmits the voice message stored in the voice data storage means to a communication party when the moving speed detected by the moving speed detection means is higher than a preset speed level.

15. The apparatus according to claim 14, further comprising non-response incoming call notification means for notifying a user of an incoming call to which the user does not respond when the incoming call control means control the incoming call.

16. The apparatus according to claim 14, wherein the incoming call control means responds to the incoming call, transmits the voice message stored in the voice data storage means to a communication party, and records voice data transmitted from the communication party in the voice data storage means, when the moving speed detected by the moving speed detection means is higher than a preset speed level.

17. The apparatus according to claim 15, further comprising non-response incoming call notification means for notifying a user of an incoming call to which the user does not respond when the incoming call control means control the incoming call.

18. The apparatus according to claim 13, wherein the apparatus further comprises voice data storage means for storing a voice message and a mode selection means for selecting a first mode and a second mode, and the incoming call control means does not control a notification of the incoming call when the moving speed detected by the moving speed detection means is higher than a preset speed level and the first mode is selected by the mode selection means, and responds to the incoming call and transmits the voice message stored in the voice data storage means to a communication party when the second mode is selected by the mode selection means.

19. The apparatus according to claim 18, further comprising non-response incoming call notification means for notifying a user of an incoming call to which the user does not respond when the incoming call control means control the incoming call.

20. The apparatus according to claim 13, wherein the apparatus further comprises voice data storage means for storing a voice message and a mode selection means for selecting a first mode and a second mode, and the incoming call control means does not control a notification of the incoming call when the moving speed detected by the moving speed detection means is higher than a preset speed level and the first mode is selected by the mode selection means, and responds to the incoming call, transmits the voice message stored in the voice data storage means to a communication party, and records voice data transmitted from the communication party in the voice data storage means when the second mode is selected by the mode selection means.

21. The apparatus according to claim 20, further comprising non-response incoming call notification means for notifying a user of an incoming call to which the user does not respond when the incoming call control means control the incoming call.

22. The apparatus according to claim 13, wherein the apparatus further comprises vibration means for vibrating the apparatus, and the incoming call control means controls an operation of the vibration means and notify a user of an incoming call when the moving speed detected by the moving speed detection means is higher than a preset speed level.

23. A method for controlling an incoming call in a radio communication apparatus for establishing communications over a radio channel, comprising:
a first step of determining whether a moving speed exceeds a predetermined value from a fading pitch of a received signal; and
a second step of responding to an incoming call and notifying that said radio communication apparatus is moving in cases where said determining step determines that the moving speed of said radio communication apparatus exceeds a predetermined value.

24. The method according to claim 23, wherein the second step includes a step of responding to the incoming call and transmitting a voice message stored in a voice data storage means to a communication party when the moving speed detected in the first step is higher than a preset speed level.

25. The method according to claim 24, further comprising a third step of notifying a user of an incoming call to which the user does not respond when the second mode is selected in the mode selection step and there is a control the incoming call in the second step.

26. The method according to claim 24, wherein the second step includes a step of responding to the incoming call, transmitting the voice message stored in the voice data storage means to communication party, and recording voice data transmitted from the communication party in the voice data storage means, when the moving speed detected in the first step is higher than a preset speed level.

27. The method according to claim 26, further comprising a third step of notifying a user of an incoming call to which the user does not respond when the second mode is selected in the mode selection step and there is a control the incoming call in the second step.

28. The method according to claim 23, wherein the method further comprises a mode selection step of selecting one of a first mode and a second mode, and the second step includes a step of not controlling a notification of the incoming call when the first mode is selected in the mode selection step and the moving speed detected in the first step is higher than a preset speed level, and responding to the incoming call and transmitting the voice message stored in the voice data storage means to a communication party when the second mode is selected in the mode selection step and the moving speed detected in the first step is higher than a preset speed level.

29. The method according to claim 28, further comprising a third step of notifying a user of an incoming call to which the user does not respond when the second mode is selected in the mode selection step and there is a control the incoming call in the second step.

30. The method according to claim 23, wherein the method further comprises a mode selection step of selecting one of a first mode and a second mode, and the second step includes a step of not controlling a notification of the incoming call when the first mode is selected in the mode selection step and the moving speed detected in the first step is higher than a preset speed level, and responding to the incoming call, transmitting the voice message stored in the voice data storage means to a communication party, and recording voice data transmitted from the communication party in the voice data storage means when the second mode is selected in the mode selection step and the moving speed detected in the first step is higher than a preset speed level.

31. The method according to claim 30, further comprising a third step of notifying a user of an incoming call to which the user does not respond when the second mode is selected in the mode selection step and there is a control the incoming call in the second step.

32. The method according to claim 23, wherein the second step includes a step of controlling an operation of vibration means for generating a vibration and notifying a user of an incoming call when the moving speed detected in the first step is higher than a preset speed level.

33. The apparatus according to claim 23, wherein the first step includes a step of detecting a power level of the received signal and detecting a fading pitch of the received signal from the power level thereby to obtain a moving speed of the apparatus.

34. The method according to claim 33, wherein the first step includes:
 a step of detecting a power level of the received signal;
 a step of comparing the detected power level with a preset fading determination level to detect occurrence of fading; and
 a step of counting the number of times the fading occurs for a predetermined period of time based on a result of the fading occurrence detecting step of detect the moving speed of the apparatus.

35. A method for controlling an incoming call in a radio communication apparatus for establishing communications over a radio channel, comprising:
 a first step of determining whether a moving speed exceeds a predetermined value from a state of a received signal; and
 a second step of responding to an incoming call and notifying that said radio communication apparatus is moving in cases where said determining step determines that the moving speed of said radio communication apparatus exceeds a predetermined value.

36. The method according to claim 35, wherein the second step includes a step of responding to the incoming call and transmitting a voice message stored in a voice data storage means to a communication party when the moving speed detected in the first step is higher than a preset speed level.

37. The method according to claim 36, further comprising a third step of notifying a user of an incoming call to which the user does not respond when the second mode is selected in the mode selection step and there is a control the incoming call in the second step.

38. The method according to claim 36, wherein the second step includes a step of responding to the incoming call, transmitting the voice message stored in the voice data storage means to communication party, and recording voice data transmitted from the communication party in the voice data storage means, when the moving speed detected in the first step is higher than a preset speed level.

39. The method according to claim 38, further comprising a third step of notifying a user of an incoming call to which the user does not respond when the second mode is selected in the mode selection step and there is a control the incoming call in the second step.

40. The method according to claim 35, wherein the method further comprises a mode selection step of selecting one of a first mode and a second mode, and the second step includes a step of not controlling a notification of the incoming call when the first mode is selected in the mode selection step and the moving speed detected in the first step is higher than a preset speed level, and responding to the incoming call and transmitting the voice message stored in the voice data storage means to a communication party when the second mode is selected in the mode selection step and the moving speed detected in the first step is higher than a preset speed level.

41. The method according to claim 40, further comprising a third step of notifying a user of an incoming call to which the user does not respond when the second mode is selected in the mode selection step and there is a control the incoming call in the second step.

42. The method according to claim 35, wherein the method further comprises a mode selection step of selecting one of a first mode and a second mode, and the second step includes a step of not controlling a notification of the incoming call when the first mode is selected in the mode selection step and the moving speed detected in the first step is higher than a preset speed level, and responding to the incoming call, transmitting the voice message stored in the voice data storage means to a communication party, and recording voice data transmitted from the communication party in the voice data storage means when the second mode is selected in the mode selection step and the moving speed detected in the first step is higher than a preset speed level.

43. The method according to claim 42, further comprising a third step of notifying a user of an incoming call to which the user does not respond when the second mode is selected in the mode selection step and there is a control the incoming call in the second step.

44. The method according to claim 35, wherein the second step includes a step of controlling an operation of vibration means for generating a vibration and notifying a user of an incoming call when the moving speed detected in the first step is higher than a preset speed level.

* * * * *